(12) United States Patent
Li et al.

(10) Patent No.: US 11,461,023 B1
(45) Date of Patent: Oct. 4, 2022

(54) FLEXIBLE EXPANSION OF DATA STORAGE CAPACITY

(71) Applicant: EMC IP Holding Company LLC, Hopkinton, MA (US)

(72) Inventors: Jun Li, San Jose, CA (US); James M. Guyer, Northboro, MA (US); Stephen R. Ives, West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/885,201

(22) Filed: Jan. 31, 2018

(51) Int. Cl.
 *G06F 3/06* (2006.01)
 *G06F 11/10* (2006.01)

(52) U.S. Cl.
 CPC ............ *G06F 3/0631* (2013.01); *G06F 3/061* (2013.01); *G06F 3/0617* (2013.01); *G06F 3/0655* (2013.01); *G06F 3/0689* (2013.01); *G06F 11/1076* (2013.01)

(58) Field of Classification Search
 CPC .... G06F 3/0631; G06F 3/0655; G06F 3/0617; G06F 11/1076; G06F 3/0689; G06F 3/061
 USPC .................................................. 711/114, 112
 See application file for complete search history.

(56) References Cited

U.S. PATENT DOCUMENTS

| | | | |
|---|---|---|---|
| 8,832,363 B1 * | 9/2014 | Sundaram | G06F 11/108 711/103 |
| 9,983,931 B1 | 5/2018 | Robins et al. | |
| 2002/0194427 A1 * | 12/2002 | Hashemi | G06F 11/1096 714/E11.034 |
| 2006/0053250 A1 * | 3/2006 | Saze | G06F 3/0608 711/114 |
| 2009/0248995 A1 * | 10/2009 | Noguchi | G06F 3/0607 711/154 |
| 2015/0355863 A1 * | 12/2015 | Kimmel | G06F 3/0605 711/114 |
| 2018/0260154 A1 * | 9/2018 | Dronamraju | G06F 3/0631 |

OTHER PUBLICATIONS

Wayne Li, et al., U.S. Appl. No. 15/395,132, filed Dec. 30, 2016, "Extent Selection With Mapped Raid".

\* cited by examiner

*Primary Examiner* — David Yi
*Assistant Examiner* — Zubair Ahmed
(74) *Attorney, Agent, or Firm* — Muirhead and Saturnelli, LLC

(57) ABSTRACT

Flexibly expanding the storage capacity of a data storage system by adding a single physical storage device or any number of disk drives to an existing storage system without the need to reconfigure existing erasure encoding groups of the system. The physical storage devices of a data storage system may be divided into a plurality of slices, and each slice may be a member of an erasure encoding group. Physical storage devices that are added to the data storage system may be divided into same number of slices and/to slices of a same size, which then may be added to existing erasure encoding groups, utilized as spare slices or left idle until all of the slices are integrated into the data storage system.

23 Claims, 11 Drawing Sheets

FLEXIBLE EXPANSION OF DATA STORAGE CAPACITY

BACKGROUND

Technical Field

This application generally relates to data storage and more particularly to erasure encoding technology, including RAID technology.

Description of Related Art

RAID is a data storage virtualization technology in which multiple physical storage disks are combined into one or more logical units in order to provide data protection in the form of data redundancy, improve system performance, and or for other reasons. Using RAID, data is distributed across the multiple drives according to one or more RAID levels, e.g., RAID-1-RAID-6, RAID 10, etc., or variations thereof, each defining different schemes providing various types and/or degrees of reliability, availability, performance or capacity. Many RAID levels employ an error protection scheme called parity, which may be considered a form of erasure encoding. In a data storage system in which RAID is employed, physical storage devices may be grouped into RAID groups according to a particular RAID schema employed.

In conventional data storage systems deployed with fixed RAID groups, expanding capacity of the storage system often requires adding a group of physical storage drives (i.e., "disk drives") with the size (i.e., having a number of drives) defined by the specific RAID type, such as 4, 8, 23 etc. For example, RAID-6 requires a minimum of four disk drives. To expand storage capacity on a RAID-6-configured system, either four or more disk drives need to be added as a new RAID group, or one or more disk drives would need to be added to one of the existing RAID groups on the system. However, reconfiguring an existing RAID group requires moving data between disks of the RAID group. Not only does this movement of data negatively impact system performance, but in the case of solid state drives (SSDs), for example, flash drives, it may cause write amplification, reducing the useful life of an SSD. Consequently, adding a disk drive to an existing RAID group often is not an attractive option, in which case adding enough disk drives to create a new RAID group is the preferred option for adding storage capacity.

As the capacity of individual disk drives continues to increase, having to add multiple disk drives to a system to satisfy a RAID type has become a limiting factor in scalability. Today, data storage consumers want to have the flexibility of adding a single disk drive or any number of disk drives into their storage systems without the need to reconfigure existing RAID groups.

SUMMARY OF THE INVENTION

In some embodiments of the invention, for a data storage system including a plurality of first physical storage devices, each physical device logically divided into a plurality of first slices of address spaces, each of at least a first subset of the plurality of first slices is a member of an erasure encoding group, the data storage system including a plurality of erasure encoding groups, each erasure encoding group including a plurality of the first slices, the plurality of erasure encoding groups including at least one non-empty erasure encoding group, a method is performed, including adding one or more second physical storage devices to the data storage system, and logically dividing at least one of the one or more second physical storage devices into a plurality of second slices of address spaces. The method further includes, if there is at least one empty erasure encoding group of the plurality of erasure encoding groups, selecting a first of the at least one empty erasure encoding group from among the at least one non-empty erasure encoding group and the at least one empty erasure encoding group and adding a first of the plurality of second slices to the first empty erasure encoding group. The method may include, if there is not at least one empty erasure encoding group of the plurality of erasure encoding groups, waiting until a modification needs to be made to a configuration of one or more or the plurality of erasure encoding groups before adding any of the plurality of second slices to any of the plurality of erasure encoding groups. The method may include determining whether spare capacity is needed on the data storage system, and, if spare capacity is needed, designating at least one of the plurality of second slices as a spare slice. Adding the at least one of the second slices to the at least one empty erasure encoding group may result in the plurality of erasure encoding groups including erasure encoding groups of different sizes. The method may further include, in response to adding the first of the second slices to the at least one empty erasure encoding group, changing a type of erasure encoding scheme of the at least one empty erasure encoding group, and/or determining at least one of: at least a threshold number of the plurality of first slices are designated as spare slices of the data storage system; and a collective storage capacity of the spare slices satisfies a threshold amount of spare capacity, and creating a new erasure encoding group including at least one of the second subset and a second of the plurality of second slices. The plurality of erasure encoding groups may be RAID groups, and/or the plurality of first physical storage devices and the one or more second physical storage devices collectively may constitute a plurality of storage devices, and, for at least two of the plurality of erasure groups, no two of the plurality of storage devices each may include slices from both of the at least two erasure encoding groups. The method may further include determining one or more erasure encoding groups whose data is accessed infrequently, designating one or more of the plurality of second slices as a member of the determined one or more erasure encoding groups in place of one or more existing slices, respectively, of the determined one or more erasure encoding groups, moving data from the one of more existing slices being replace to the one or more designated second slices, respectively, and re-designating the one or more existing slices as spare slices or as undesignated slices.

In some embodiments, a system is provided, including a plurality of physical storage devices, each physical device logically divided into a plurality of first slices of address spaces, each of at least a first subset of the plurality of first slices is a member of an erasure encoding group, the data storage system including a plurality of erasure encoding groups, each erasure encoding group including a plurality of the first slices, the plurality of erasure encoding groups including at least one non-empty erasure encoding group. The system further includes one or more processors and a memory including code stored thereon that, when executed, performs a method. The method includes adding one or more second physical storage devices to the data storage system, logically dividing at least one of the one or more second physical storage devices into a plurality of second slices of address spaces, and, if there is at least one empty erasure encoding group of the plurality of erasure encoding groups: selecting a first of the at least one empty erasure encoding group from among the at least one non-empty erasure encoding group and the at least one empty erasure encoding group; and adding a first of the plurality of second slices to the first empty erasure encoding group. The method may include, if there is not at least one empty erasure encoding group of the plurality of erasure encoding groups, waiting until a modification needs to be made to a configuration of one or more or the plurality of erasure encoding groups before adding any of the plurality of second slices to any of the plurality of erasure encoding groups. The method may include determining whether spare capacity is needed on the data storage system, and, if spare capacity is needed, designating at least one of the plurality of second slices as a spare slice. Adding the at least one of the second slices to the at least one empty erasure encoding group may result in the plurality of erasure encoding groups including erasure encoding groups of different sizes. The method may further include, in response to adding the first of the second slices to the at least one empty erasure encoding group, changing a type of erasure encoding scheme of the at least one empty erasure encoding group, and/or determining at least one of: at least a threshold number of the plurality of first slices are designated as spare slices of the data storage system; and a collective storage capacity of the spare slices satisfies a threshold amount of spare capacity, and creating a new erasure encoding group including at least one of the second subset and a second of the plurality of second slices. The plurality of erasure encoding groups may be RAID groups, and/or the plurality of first physical storage devices and the one or more second physical storage devices collectively may constitute a plurality of storage devices, and, for at least two of the plurality of erasure groups, no two of the plurality of storage devices each may include slices from both of the at least two erasure encoding groups. The method may further include determining one or more erasure encoding groups whose data is accessed infrequently, designating one or more of the plurality of second slices as a member of the determined one or more erasure encoding groups in place of one or more existing slices, respectively, of the determined one or more erasure encoding groups, moving data from the one of more existing slices being replace to the one or more designated second slices, respectively, and re-designating the one or more existing slices as spare slices or as undesignated slices.

In some embodiments, a non-transitory computer-readable medium having software stored thereon for a data storage system including a plurality of first physical storage devices, each physical device logically divided into a plurality of first slices of address spaces, each of at least a first subset of the plurality of first slices is a member of an erasure encoding group, the data storage system including a plurality of erasure encoding groups, each erasure encoding group including a plurality of the first slices, the plurality of erasure encoding groups including at least one non-empty erasure encoding group. The software includes executable code that adds one or more second physical storage devices to the data storage system, and executable code that logically divides at least one of the one or more second physical storage devices into a plurality of second slices of address spaces. The software further includes executable code that, if there is at least one empty erasure encoding group of the plurality of erasure encoding groups, selects a first of the at least one empty erasure encoding group from among the at least one non-empty erasure encoding group and the at least one empty erasure encoding group; and adds a first of the plurality of second slices to the first empty erasure encoding group. The software may include executable code that determines whether spare capacity is needed on the data storage system, and executable code that designates at least one of the plurality of second slices as a spare device if spare capacity is needed. The software may further include executable code that determines at least one of: at least a threshold number of the plurality of first slices are designated as spare slices of the data storage system and; a collective storage capacity of the spare slices satisfies a threshold amount of spare capacity, and executable code that creates a new erasure encoding group including at least one of the second subset and a second of the plurality of second slices. The plurality of first physical storage devices and the one or more second physical storage devices collectively may constitute a plurality of storage devices, and, for at least two of the plurality of erasure groups, no two of the plurality of storage devices may each include slices from both of the at least two erasure encoding groups. The software may further include executable code that determines one or more erasure encoding groups whose data is accessed infrequently, executable code that designates one or more of the plurality of second slices as a member of the determined one or more erasure encoding groups in place of one or more existing slices, respectively, of the determined one or more erasure encoding groups, executable code that moves data from the one of more existing slices being replace to the one or more designated second slices, respectively, and executable code that re-designates the one or more existing slices as spare slices or as undesignated slices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENTS

Figure 1:
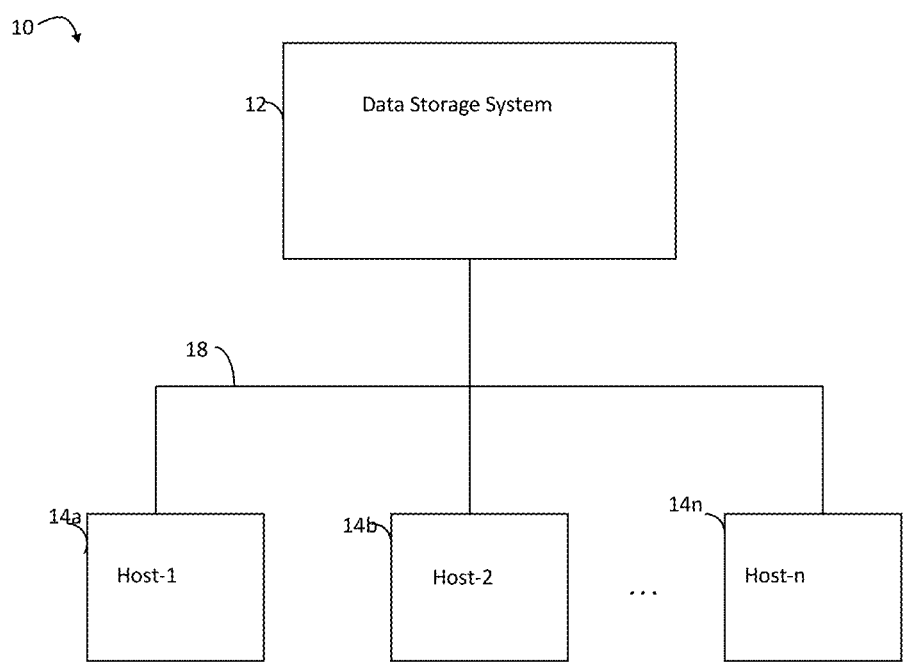
FIG. 1 is a block diagram illustrating an example of a system according to embodiments of the system described herein.

Described herein is a system and methods for flexibly expanding the storage capacity of a data storage system by adding a single disk drive (i.e., "physical storage device") or any number of disk drives to an existing storage system without the need to reconfigure existing erasure encoding groups (e.g., RAID groups) of the system. As used herein, an "erasure encoding group" (e.g., a RAID group) is a group of physical storage devices, or slices thereof, grouped together, and defined as a group, to provide data protection in the form of data redundancy in accordance with an error protection scheme, for example, a RAID level or a variation thereof. The manner in which an erasure encoding group, for example a RAID group, can provide data protection in accordance with some embodiments od the invention, is described in U.S. patent application Ser. No. 14/587,371, titled "Optimizing Spare Capacity and Spare Distribution" by Robins et al. filed on Dec. 31, 2014, (the '371 application), the entire contents of which are hereby incorporated by reference. Being able to add a single disk or any number of disks without the need to reconfigure existing erasure encoding groups saves the consumer the additional cost of purchasing extraneous capacity solely for the purpose of satisfying requirements of the RAID type, while avoiding the negative impact to system performance and write amplification that reconfiguring erasure encoding groups may cause.

The physical storage devices of a data storage system may be divided into a plurality of slices, where a "slice" is a contiguous sequential set of logical or physical block addresses of a physical device, and each slice may be a member of an erasure encoding group, e.g., a RAID group. Thus, unlike conventional RAID systems in which the members of the RAID group are physical storage devices in their entireties, in embodiments herein, the members of a RAID group, or another type of erasure encoding group, may be slices of physical storage devices.

In some embodiments, it may be desirable for at least two (preferably all) of the erasure encoding groups to have a property referred to herein as a unity condition, in which, for the at least two erasure encoding groups, no more than two of the plurality of physical storage devices each include slices from both of the at least two erasure encoding groups, for example, as described in more detail elsewhere herein. Generally, it is desirable to maintain the unity condition on a data storage system, for example, for reasons described in the '371 application.

Physical storage devices that are added to the data storage system may be divided into the same number of slices and/to slices of a same size, which then may be added to existing erasure encoding groups, utilized as spare slices or left idle until all of the slices are integrated into the data storage system, as described elsewhere herein in more detail. Existing erasure encoding groups, and those resulting from adding additional slices may adhere to any of a plurality or rules, including any requirements of the erasure encoding scheme employed. For example, each erasure encoding group may adhere to certain redundancy requirement, where redundancy r is defined as r=R−k, where R is the number of members in a erasure encoding group, such that k out of R surviving members of a data set will enable reconstruction of data on up to r failures in the RAID group. Should (R−k)+1 members fail, the data cannot be reconstructed and data loss results. Further, a certain number of slices per erasure encoding group may need to be dedicated to erasure encoding (e.g., parity).

Referring now to FIG. 1, shown is an example of an embodiment of a system 10 according to some embodiments of the system described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Communication media that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
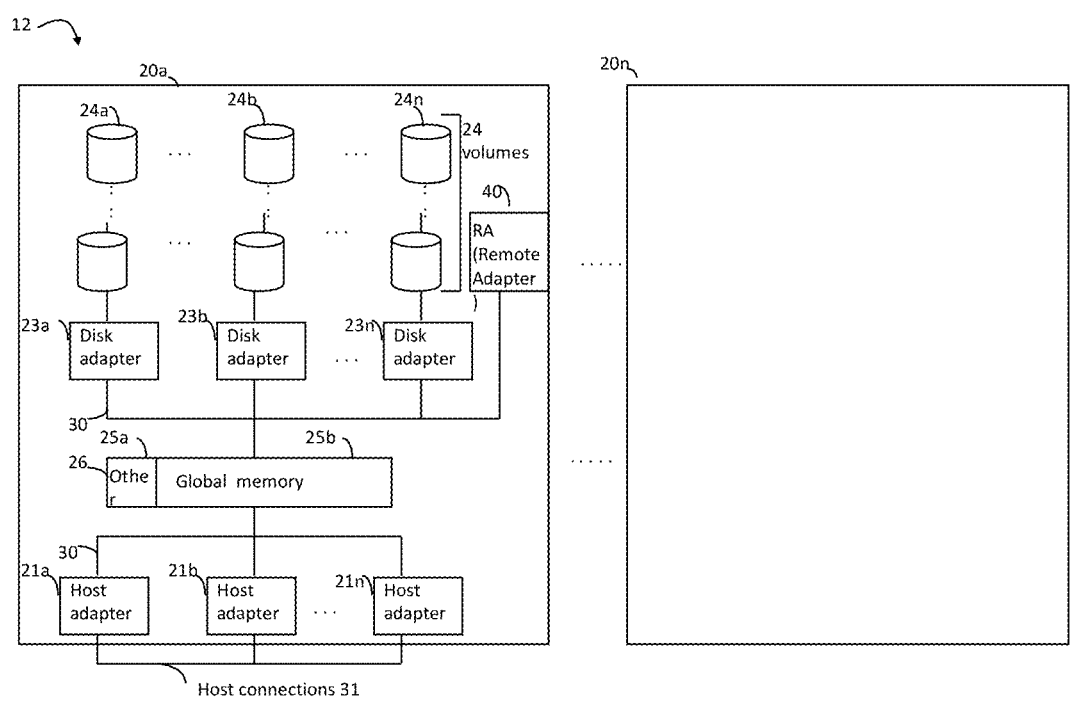
FIG. 2A is a block diagram illustrating an example of a data storage system according to embodiments of the system described herein.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, 3D) (Point (3DXP) and the like, which also may be referred to herein as "physical storage drives," "physical drives" or "disk drives." The particular data storage system as described in this embodiment, or a particular device thereof, such as a rotating disk or solid-state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
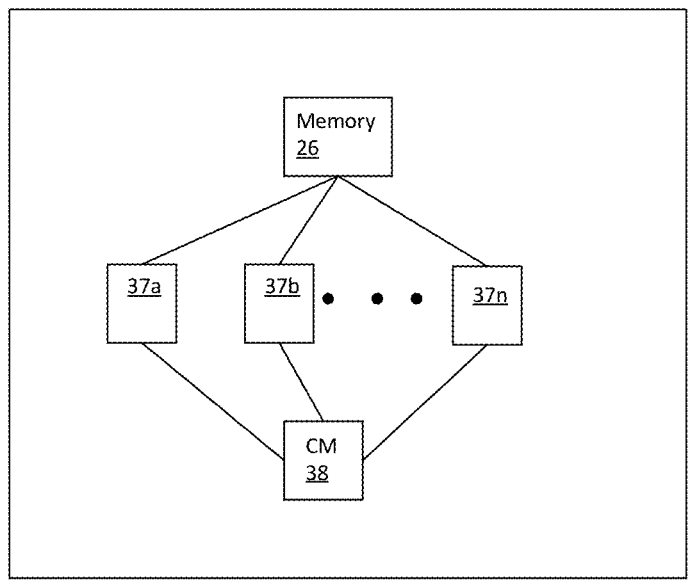
FIG. 2B is a representation of logical internal communications between directors and memory of the data storage system of FIG. 2A according to embodiments of the system described herein.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37*a*-37*n* may be able to broadcast a message to all of the other directors 37*a*-37*n* at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In some embodiments of the system described herein, the data storage system as described in relation to FIGS. 1-2A may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host.

Figure 3A:
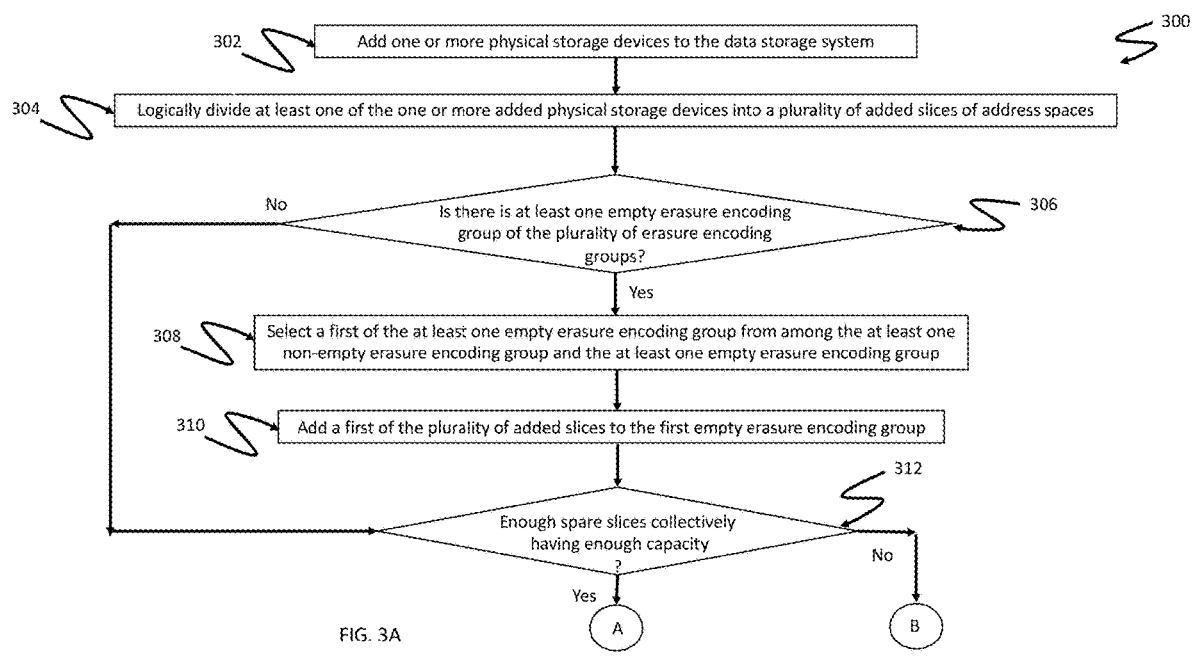
FIGS. 3A and 3B are a flowchart illustrating an example of a method of flexibly expanding storage capacity of a data storage system according to embodiments of the system described herein.
Figure 3B:
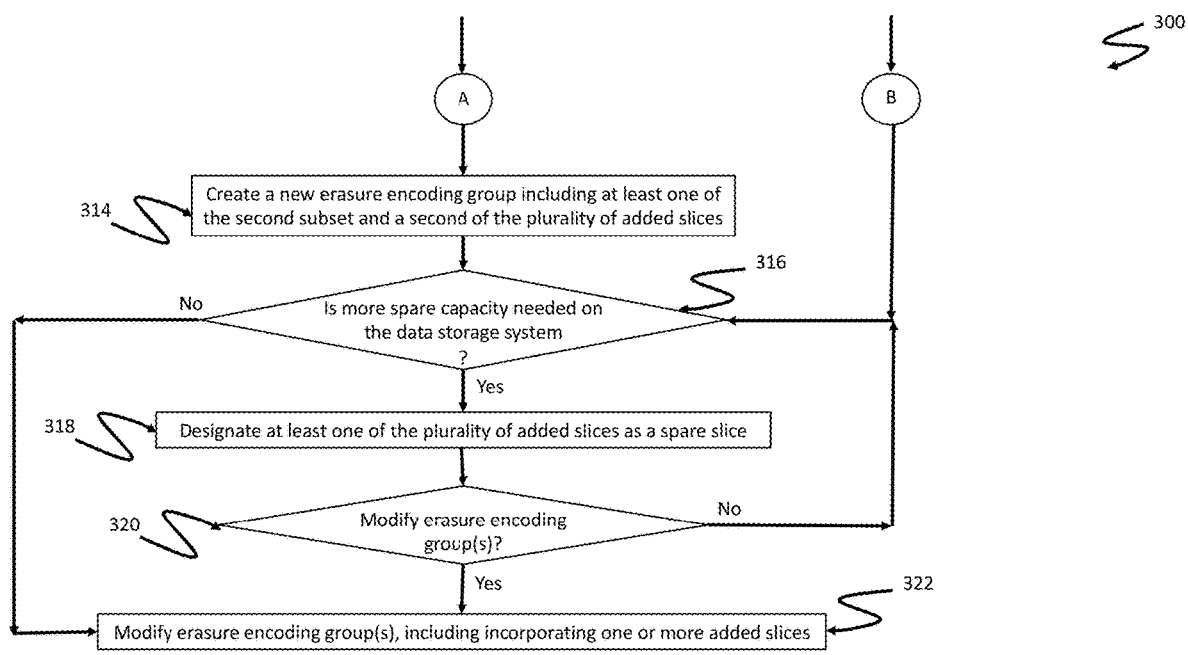

FIGS. 3A and 3B illustrate an example of a method 300 of flexibly expanding storage capacity of a data storage system according to embodiments of the system described herein. Other embodiments of a method of flexibly expanding storage capacity of a data storage system, for example, variations of method 300, are possible and are intended to fall within the scope of the invention. Method 300, or parts thereof, may be implemented using the system described in relation to FIGS. 1-2B or components thereof. In some embodiments, the data storage system includes a plurality of physical storage devices (i.e., existing storage devices), each physical device logically divided into a plurality of existing slices of address spaces. The data storage system may include a plurality of erasure groups, and each of at least a subset of the plurality of existing slices may be a member of one of the plurality of erasure encoding groups.

Figure 4:
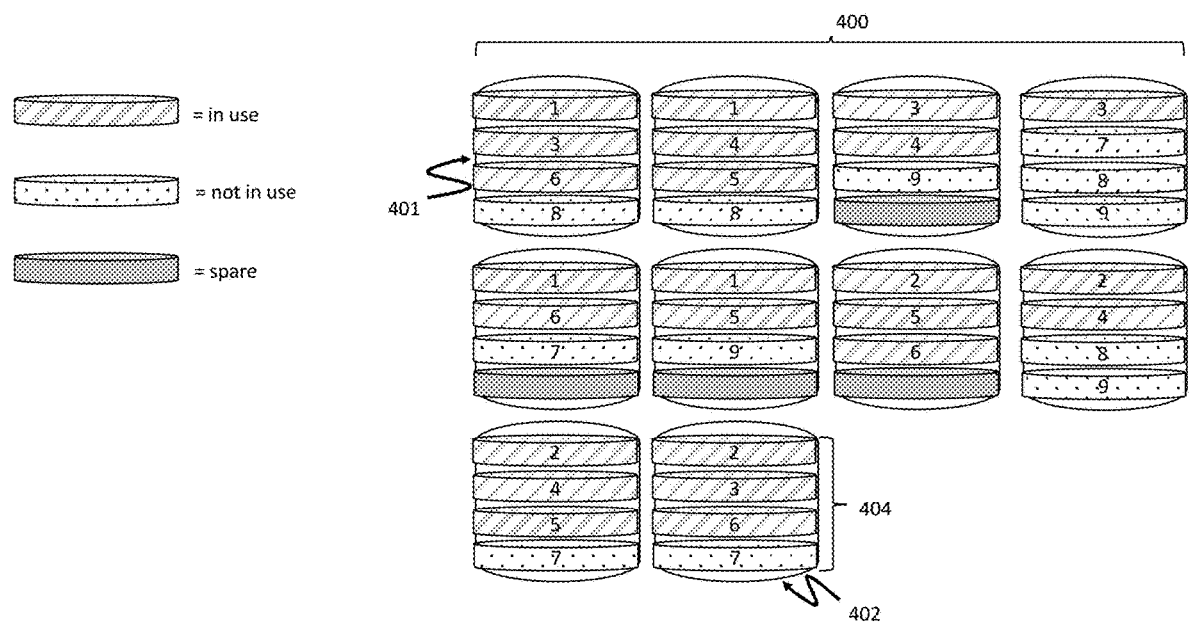
FIG. 4 is a block diagram illustrating an example of a plurality of physical storage devices of a data storage system divided into a plurality of slices, according to embodiments of the system described herein.

For example, FIG. 4 is a block diagram illustrating an example of a plurality of physical storage devices 400 of a data storage system divided into a plurality of slices, according to embodiments of the system described herein. Other embodiments of a plurality of physical storage devices of a data storage system divided into a plurality of slices, for example, variations of physical storage devices 400 illustrated in FIG. 4, are possible and are intended to fall within the scope of the invention. FIG. 4 illustrates an embodiment in which each physical storage device (e.g., device 404) is divided into 4 slices (e.g., slices 404). It should be appreciated that the invention is not so limited, and any number of slices per physical storage device (e.g. 8, 16, 20, 25, 32, 64, 75, 100, etc.) may be configured. The number and size of slices on a physical device may be based on any of a variety of factors, including but not limited to: physical devices' storage capacity, erasure encoding scheme(s)/type(s) being used; desired granularity/flexibility; performance, management cost, etc. Four slices are used in FIG. 4 purely for illustrative purposes. Further, different physical storage devices may be divided into different numbers and sizes of slices, as long as the requirements of the erasure coding type used (e.g., RAID-5, RAID-6, RAID-10) for each erasure encoding group are met. In some embodiments, every physical storage device of a data system, including those added, is divided into a same number of slices, and every slice has the same size.

As shown in FIG. 4, each slice may have one of three states: 1) currently a member of a configured erasure encoding group having at least some data stored thereon (i.e., "in use"); 2) currently a member of a configured erasure encoding group having no data stored thereon (i.e., "not in use" or "empty"); or 3) designated as spare capacity. The amount (e.g., percentage) and distribution of the spare slices on the storage may be determined as described in the '371 application. The number appearing in any slice represents the erasure encoding group to which the slice belongs, totaling nine erasure encoding groups: 1-9. In the embodiment illustrated in FIG. 4, each erasure encoding group has four members. For example, each erasure group may be a RAID-5 group, or variation thereof, in which 3 of the 4 slices store actual data, and the fourth slice serves as an erasure encoding (e.g., parity) slice. As illustrated in FIG. 3, of the nine erasure encoding groups, groups 1-6 are in use, and groups 7-9 are not in use. There also are four spare slices.

In some embodiments of the invention, the unity condition is exhibited for at least two (e.g., all) of the plurality of erasure encoding groups, in which at least no two of the plurality of physical storage devices each include slices from both of the at least two erasure encoding groups. For example, in the embodiment illustrated in FIG. 4, while physical storage device 401 includes slices for erasure groups 1 and 3, no other of the plurality of storage devices 400 includes both erasure groups 1 and 3.

Figure 5:
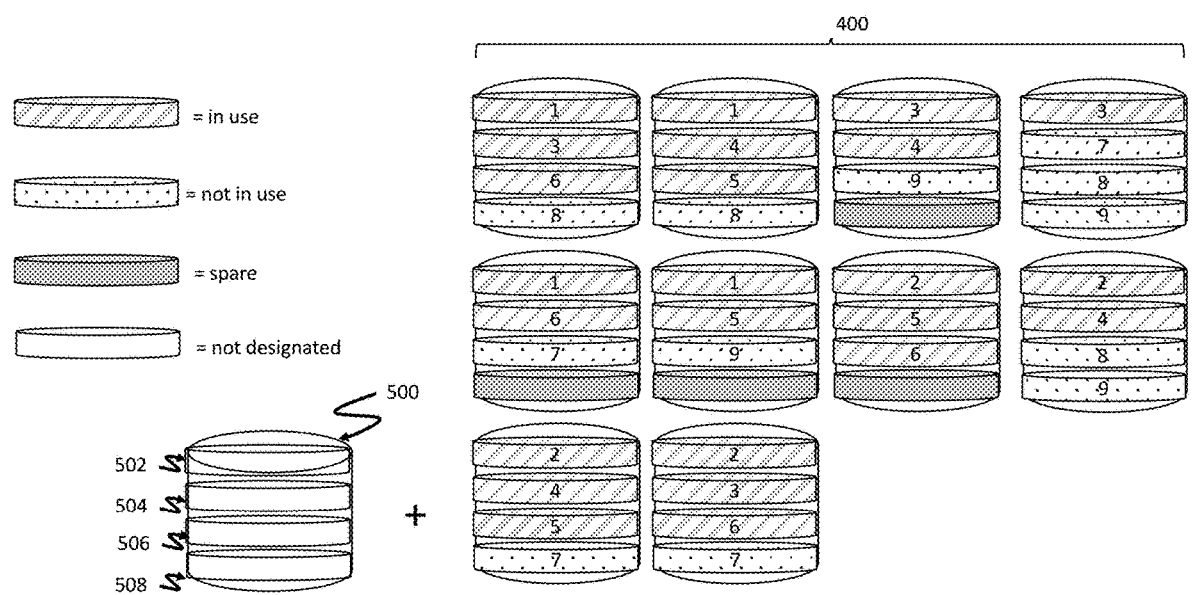
FIG. 5 is a block diagram illustrating an example of a physical storage device divided into a plurality of slices being added to a plurality of physical storage devices of a data storage system divided into a plurality of slices, according to embodiments of the system described herein.

Returning to method 300, in step 302, one or more physical storage devices may be added to the data storage device, and in step 304 at least one of the one or more added physical storage devices may be divided into a plurality of slices of address spaces (i.e., added slices). For example, FIG. 5 is a block diagram illustrating an example of a physical storage device 500 divided into a plurality of slices 502-508 being added to the plurality of physical storage devices 400. As illustrated in FIG. 5, none of slices 502-508 have been designated yet. In some embodiments, the one or more added storage devices may sit idle and ready for use for an indefinite period of time until the need arises to use the storage capacity thereof, for example, in response to a write I/O request that requires that a new erasure encoding group be created, or the updating of one or more erasure encoding groups, for example, during performance of steps 306-322 of method 300.

In step 306 of method 300, it may be determined whether there is at least one empty erasure encoding group of the plurality of erasure encoding groups; i.e., at least one erasure encoding group for which no data is currently stored. If there is at least one empty erasure encoding group, then, in step 308, a first of the at least one empty erasure encoding group may be selected from among the at least one non-empty erasure encoding group and the at least one empty erasure encoding group, and a first of the plurality of added slices may be added to the first empty erasure encoding group. As described above, empty erasure encoding groups may be selected over erasure encoding groups in use to avoid having to move data between physical storage devices when adding a slice from a new physical device to the erasure group, which would require reconfiguring the erasure group and moving data accordingly. For example, as illustrated in FIG.

Figure 6:
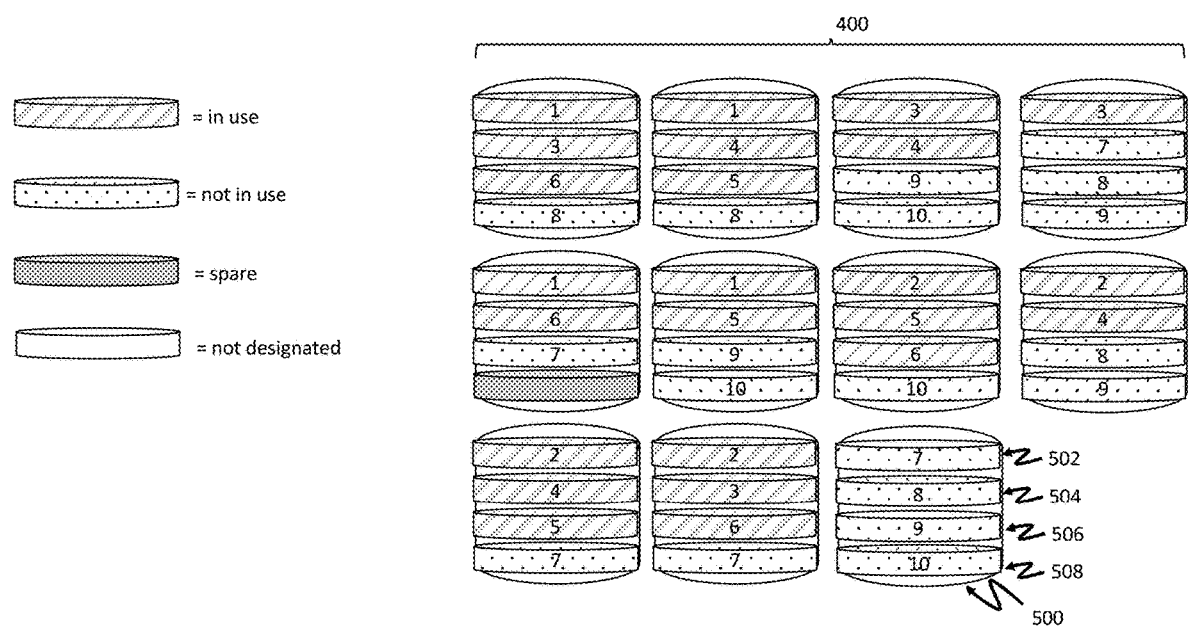
FIG. 6 is a block diagram illustrating an example of a plurality of physical storage devices of a data storage system divided into a plurality of slices, according to embodiments of the system described herein.
Figure 7:
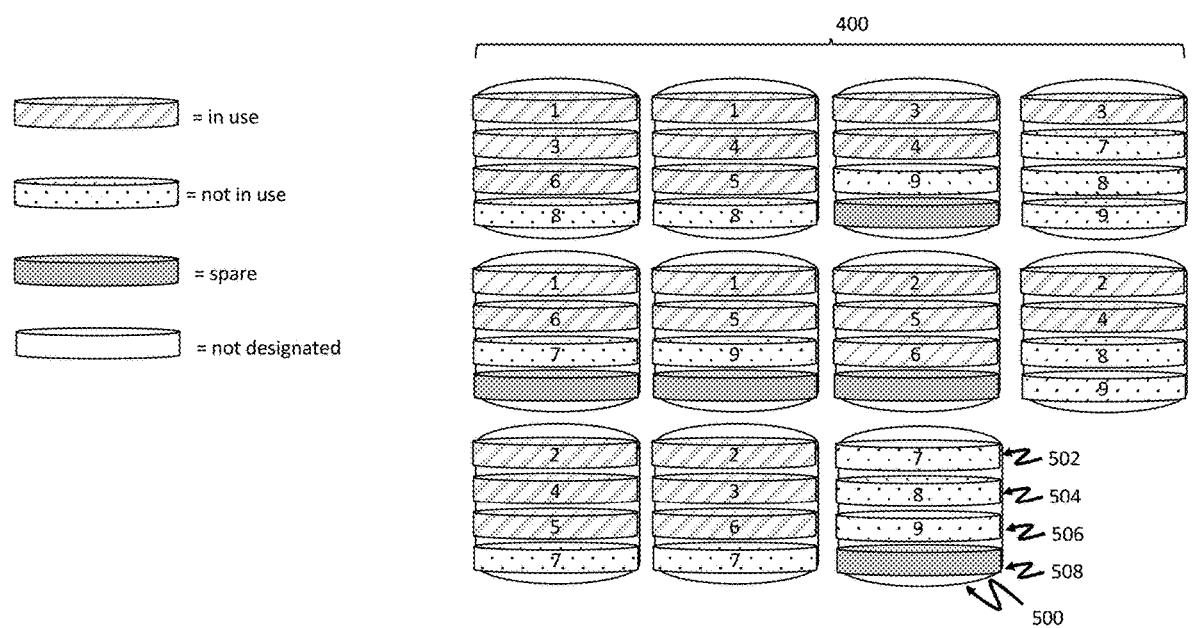
FIG. 7 is a block diagram illustrating an example of a plurality of physical storage devices of a data storage system divided into a plurality of slices, according to embodiments of the system described herein.
Figure 8:
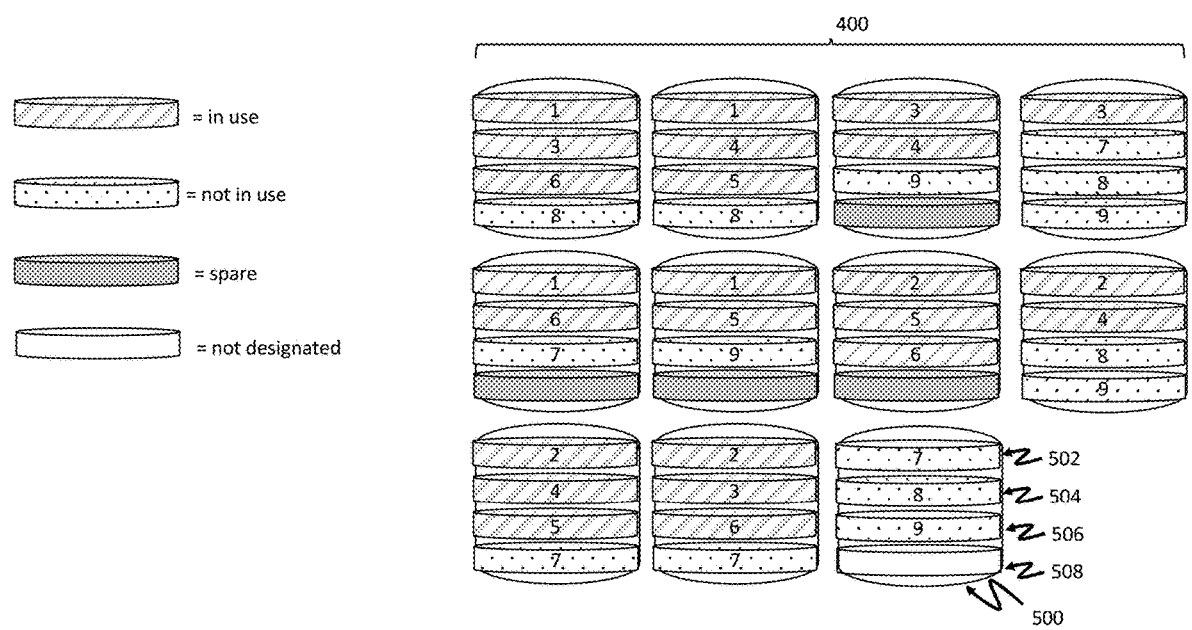
FIG. 8 is a block diagram illustrating an example of a plurality of physical storage devices of a data storage system divided into a plurality of slices, according to embodiments of the system described herein.

4, there are three erasure encoding groups, 7-9, not in use (i.e., empty) of the plurality of erasure encoding groups 400. Accordingly, as illustrated in FIGS. 6-8, slices 502-506 may be added to empty erasure encoding groups 7-9.

It should be appreciated that, by adding a slice to each of erasure encoding groups 7-9, each of these erasure encoding groups now has a different number of slices than erasure encoding groups 1-6. In some embodiments, in which at least one disk of an erasure encoding group is dedicated to erasure encoding, a different ratio between slices actually storing data and those being used for erasure codes (e.g., parity) will result from adding one of the added slices to the erasure encoding group. Further, in response to adding slices to the at least one empty erasure encoding group, the type of erasure encoding scheme of the at least one empty erasure encoding group may be changed, for example, from RAID 5 to RAID 6, albeit it may not be desired to do so and have different erasure encoding schemes in a same data storage system, which may cause confusion.

In some embodiments of the invention, it may be desirable to have a threshold number of slices (e.g., percentage of total slices) be spare slices and/or a threshold amount (e.g., percentage) of storage capacity be spare storage, for example, 2% of slices and/or storage capacity. These thresholds may be referred to herein as a spare slice threshold and a spare storage threshold, respectively, and may depend on any of a plurality of factors, including, but not limited to, performance, the desired degree of data protection, the erasure encoding scheme used, and the financial cost of storage capacity. In such embodiments, after performance of step 310, or if it is determined in step 306 that there are no empty erasure encoding groups, then, in step 312, it may be determined whether: at least a threshold number of the plurality of existing slices (e.g., 400) are designated as spare slices of the data storage system; and a collective storage capacity of the spare slices satisfies a threshold amount of spare capacity. This threshold number and threshold amount may be greater than the spare slice threshold and spare capacity threshold, respectively. The purpose for checking these thresholds may be to determine whether the spare slice threshold and spare capacity threshold would still be satisfied if current spare slices were used to create a new one or more erasure encoding groups, for example, in combination with slices of a new physical storage device being added. This determination may depend on many factors, including, but not limited to, the type and size of erasure groups being created. If it determined in step 312 that there are enough spare slices and/or space capacity, then, in act 314, a new erasure encoding group including at least one of the second subset and a second of the plurality of added sliced may be created. For example, FIG. 7 illustrates the creation of erasure encoding group 10 using previously spare slices from the plurality of physical storage devices 400 and slice 508 of added physical storage device 500.

If it is determined in step 312 that there is not enough spare capacity and/or slices, or, in the alternative, after performance of step 314, it may be determined whether more spare capacity is needed on the data storage system, for example, whether a spare capacity threshold is met. If it is determined that more capacity is needed, then, in step 318, at least one of the plurality of added slices (i.e., slices of the new physical storage device) may be designated as a spare slice, for example, slice 508 in FIG. 6.

After performance of step 318, or if it is determined in step 316 that no more spare capacity is needed, then in step 320 it may be determined whether to modify (e.g., update) one or more erasure encoding groups, for example, when it is time to update one or more of the erasure encoding groups, for example, because the one or more groups are nearing or are at capacity, or because of a desire to change the type of erasure encoding protection (e.g., from RAID 5 to RAID 10). If it is determined that one or more erasure encoding groups are to be modified, then this is done in step 322, which may include adding one or more slices of the physical storage device being added. If it is determined in step 320 that no erasure encoding groups are to be modified, then method 300 may return to step 316. Although illustrated in a serial fashion, the loop defined by steps 316-322 can be considered a state in which one or more slices of the new physical storage device remain undesignated until designated as part of an erasure encoding group or as a spare slice. In some embodiments, the loop may include returning to step 306, which would accommodate a scenario in which one or more erasure encoding groups that once were in use become unused, or returning to step 312, which would accommodate a scenario in which one or more slices that were previously part of an erasure encoding group become spare slices. FIG. 8 illustrates a scenario in which at least one slice, 508, of the new physical storage device 500, remains undesignated.

Figure 9:
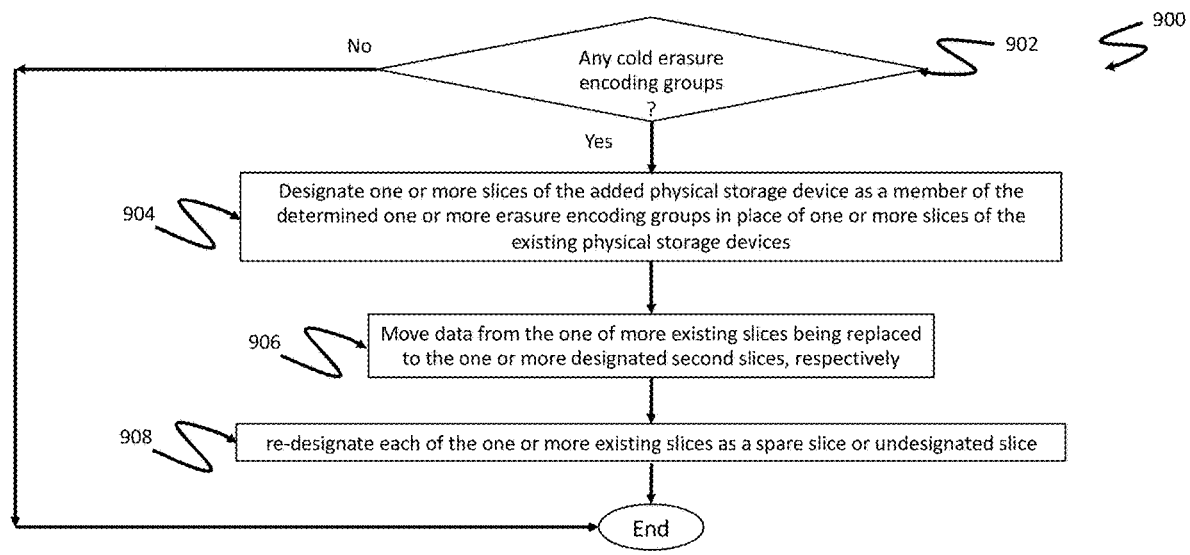
FIG. 9 is a flowchart illustrating an example of a method of designating slices of an added physical storage device in place of slices of infrequently accessed encoding groups according to embodiments of the system described herein.

FIG. 9 is a flowchart illustrating an example of a method 900 of designating slices of an added physical storage device in place of slices of infrequently accessed encoding groups according to embodiments of the system described herein. Other embodiments of a method of designating slices of an added physical storage device in place of slices of infrequently accessed encoding groups, for example, variations of method 900, are possible and are intended to fall within the scope of the invention. Method 900, or parts thereof, may be implemented using the system described in relation to FIGS. 1-2B or components thereof. Method 900 may be performed as part of method 300, or independently thereof.

In step 902, it may be determined whether there are one of more erasure encoding groups that have cold data, i.e., that have data that is accessed relatively infrequently. Determining whether data is accessed infrequently may be determined in any of a variety of ways using any of a variety of known metrics. For example, it may be determined whether the rate of data access for the erasure encoding group, or a portion thereof, reaches a certain threshold. If it is determined that there are not any cold erasure encoding groups, then method 900 may end. If it is determined that there is at least one cold erasure encoding group, then method 900 may proceed to step 904. For example, it may be determined that erasure encoding groups 3, 6 and 7 of FIG. 4 are cold erasure encoding groups.

In step 904, one or more slices of the added physical storage device may be designated as a member of the one or more erasure encoding groups determined to be cold in place of one or more slices of such existing physical storage devices. In step 906, data may be moved from the one of more existing slices to the one or more designated slices, respectively. For example, slice 502 of added physical device 500 may be designated as a member of erasure encoding group 3 in place of one of the group 3 slices, and the data from the group 3 slice moved to slice 502; slice 504 may be designated as a member of erasure encoding group 6 in place of one of the group 6 slices, and the data from the group 6 slice moved to slice 504; and slice 506 may be designated as a member of erasure encoding group 7 in place of one of the group 7 slices, and the data from the group 7 slice moved to slice 506. In step 908, each of the one or more existing slices being replaced (e.g., from group 3, 6 or 7) may be re-designated as a spare slice or an undesignated slice.

In some embodiments, it is desirable to have spare slices and slices of erasure encoding groups distributed in as balanced a fashion as possible, to allow for more flexibility when future changes become necessary, for example, when it becomes necessary to modify existing erasure encoding groups because of reaching storage capacity or otherwise. For this reason, it may be desirable to perform method 900 for cold data, as the data can be moved relatively quickly without significantly degrading system performance, the result being a more balanced distribution of spare, designated and undesignated slices; for example, by creating multiple spare or undesignated slices across multiple physical devices as opposed to having multiple spare or undesignated slices remain on an added physical device until otherwise needed, for example, as described above in relation to method 300. It may be particularly desirable to perform method 900 if it is determined that one or more erasure encoding groups are nearing capacity, in which case a more balanced distribution of spare, undesignated and designed slices can be achieved before it becomes necessary to reconfigure erasure encoding groups.

Although not illustrated in FIGS. 3A and 3B or FIG. 9, method 300 and/or method 900 may apply one or more rules intended to minimize the effects of write amplification when one or more of the physical storage devices are, or potentially could be, an SSD, and also may apply one or more rules intended to maximize system performance and availability, in addition to those embodied in the steps of method 300 and 900 described herein.

Steps 306-322, 312-322 or 316-32 and/or steps 902-908 may be repeated, or performed continually, until all of the slices of an added physical storage device (e.g., 500) have been fully integrated into the storage system, i.e., designated as part of an erasure group or as a spare slice, which may have resulted in the increase in size of one or more erasure encoding groups and/or the creation of one or more erasure encoding groups. Further, it should be appreciated that method 300 or 900 may include adding multiple physical storage devices to a storage system concurrently, and the steps thereof taking into consideration the slices of each of the multiple storage devices being added. Further, while method 300 and/or 900 is being performed on a physical storage device that has been added to a data storage system, one or more physical storage devices may be added to the system, at the same time or serially. In each case, method 300 and/or 900 may be performed in such a way that the slices of each physical storage device are processed independently of the other, or slices from two or more of the physical storage devices may be considered collectively. Depending on the erasure encoding scheme being used, if enough physical storage devices are being added concurrently, a new erasure encoding group may be created using only slices from the devices being added.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage system including a plurality of first physical storage devices and a plurality of erasure encoding groups, wherein each first physical storage device is logically divided into a plurality of first slices of address spaces, one or more of the plurality of first slices is a member of one of the plurality of erasure encoding groups, each erasure encoding group includes a plurality of the first slices, and the plurality of erasure encoding groups includes at least one non-empty erasure encoding group, a method comprising:

adding one or more second physical storage devices to the data storage system;

logically dividing at least one of the one or more second physical storage devices into a plurality of second slices of address spaces;

determining whether there is at least one empty erasure encoding group among the plurality of erasure encoding groups, the at least one empty erasure encoding group having no data currently stored thereon;

responsive to determining that there is at least one empty erasure encoding group among the plurality of erasure encoding groups, performing first processing including:

selecting a first empty erasure encoding group from among the at least one empty erasure encoding group; and adding a first of the plurality of second slices to the first empty erasure encoding group;

determining that a first modification needs to be made to a first configuration of a first erasure encoding group of the one or more of the plurality of erasure encoding groups; and responsive to determining that the first modification needs to be made to the first configuration of the first erasure encoding group, performing second processing that modifies the first configuration of the first erasure encoding group, said second processing including:

adding at least one of the plurality of second slices to the first erasure encoding group; and performing the first modification to the first erasure encoding group, wherein the first modification includes changing a type of erasure encoding protection of the first erasure encoding group, wherein a first number of the plurality of first slices are spare slices having a collective spare storage capacity, wherein a new erasure encoding group to be created is configured from a second number of slices denoting a second storage capacity, and wherein the method further comprises:

determining whether at least a threshold number of the spare slices meeting at least a spare threshold capacity would remain if the new erasure encoding group, having a configuration with the second number of slices denoting the second storage capacity, is created from slices selected from a combination of the first number of spare slices and the plurality of second slices of the added one or more second physical storage devices; and responsive to determining that at least the threshold number of the spare slices meeting at least the spare threshold capacity would remain if the new erasure encoding group is created, creating the new erasure encoding group with the second number of slices denoting the second storage capacity, and otherwise not creating the new erasure encoding group.

2. The method according to claim 1, wherein responsive to determining that there is not at least one empty erasure encoding group of the plurality of erasure encoding groups, waiting until a modification needs to be made to a configuration of one or more of the plurality of erasure encoding groups before adding any of the plurality of second slices to any of the plurality of erasure encoding groups.

3. The method according to claim 1, further comprising; determining whether spare capacity is needed on the data storage system; and responsive to determining that spare capacity is needed, designating at least one of the plurality of second slices as a spare slice.

4. The method according to claim 1, wherein adding the at least one of the second slices to the at least one empty erasure encoding group results in the plurality of erasure encoding groups including erasure encoding groups of different sizes.

5. The method according to claim 1, further comprising:
determining whether at least a first threshold number of the plurality of first slices are designated as the spare slices of the data storage system, and whether a first collective storage capacity of the spare slices satisfies a first threshold amount of spare capacity; and in response to determining that at least the first threshold number of the plurality of first slices are designated as the spare slices of the data storage system and that the first collective storage capacity of the spare slices satisfies the first threshold amount of spare capacity, creating a first new erasure encoding group including at least one spare slice from the one or more first slices and a second of the plurality of second slices.

6. The method according to claim 1, wherein the plurality of erasure encoding groups are RAID groups.

7. The method according to claim 1, wherein the plurality of first physical storage devices and the one or more second physical storage devices collectively constitute a plurality of storage devices, and wherein, for at least two of the plurality of erasure encoding groups, no two of the plurality of physical storage devices each include slices from both of the at least two erasure encoding groups.

8. The method according to claim 1, further comprising:
determining one or more of the plurality of erasure encoding groups whose data is accessed infrequently;
designating one or more of the plurality of second slices as a member of the determined one or more erasure encoding groups in place of one or more existing slices, respectively, of the determined one or more erasure encoding groups;

moving data from the one of more existing slices being replaced to the one or more designated second slices, respectively; and re-designating the one or more existing slices as spare slices or as undesignated slices.

9. The method of claim 1, wherein the first erasure encoding group is a RAID group configured to have a first RAID level as the type of erasure encoding protection, and wherein the first modification includes reconfiguring the first erasure encoding group and changing the type of erasure encoding protection of the first erasure encoding group from the first RAID level to a second RAID level that is different from the first RAID level.

10. The method of claim 9, wherein the first modification includes expanding a current storage capacity of the first erasure encoding group responsive to the current storage capacity of the first erasure encoding group being consumed.

11. The method of claim 1, wherein the plurality of first physical storage devices and the plurality of second physical storage devices are solid state drives providing non-volatile data storage.

12. A data storage system comprising:
a plurality of erasure encoding groups;
a plurality of physical storage devices, wherein each physical storage device is logically divided into a plurality of first slices of address spaces, one or more of the plurality of first slices is a member of one of the plurality of erasure encoding groups, each erasure encoding group includes a plurality of the first slices, and the plurality of erasure encoding groups includes at least one non-empty erasure encoding group;
one or more processors; and
a memory comprising code stored thereon that, when executed, performs a method comprising:
adding one or more second physical storage devices to the data storage system;
logically dividing at least one of the one or more second physical storage devices into a plurality of second slices of address spaces;
determining whether there is at least one empty erasure encoding group among the plurality of erasure encoding groups, the at least one empty erasure encoding group having no data currently stored thereon;
responsive to determining that there is at least one empty erasure encoding group among the plurality of erasure encoding groups, performing first processing including:
selecting a first empty erasure encoding group from among the at least one empty erasure encoding group; and
adding a first of the plurality of second slices to the first empty erasure encoding group;
determining that a first modification needs to be made to a first configuration of a first erasure encoding group of the one or more of the plurality of erasure encoding groups; and
responsive to determining that the first modification needs to be made to the first configuration of the first erasure encoding group, performing second processing that modifies the first configuration of the first erasure encoding group, said second processing including:

adding at least one of the plurality of second slices to the first erasure encoding group; and performing the first modification to the first erasure encoding group, wherein the first modification includes changing a type of erasure encoding protection of the first erasure encoding group, wherein a first number of the plurality of first slices are spare slices having a collective spare storage capacity, wherein a new erasure encoding group to be created is configured from a second number of slices denoting a second storage capacity, and wherein the method further comprises:

determining whether at least a threshold number of the spare slices meeting at least a spare threshold capacity would remain if the new erasure encoding group, having a configuration with the second number of slices denoting the second storage capacity, is created from slices selected from a combination of the first number of spare slices and the plurality of second slices of the added one or more second physical storage devices; and responsive to determining that at least the threshold number of the spare slices meeting at least the spare threshold capacity would remain if the new erasure encoding group is created, creating the new erasure encoding group with the second number of slices denoting the second storage capacity, and otherwise not creating the new erasure encoding group.

13. The system according to claim 12, wherein responsive to determining that there is not at least one empty erasure encoding group of the plurality of erasure encoding groups, waiting until a modification needs to be made to a configuration of one or more of the plurality of erasure encoding groups before adding any of the plurality of second slices to any of the plurality of erasure encoding groups.

14. The system according to claim 12, wherein the method further comprises:

determining whether spare capacity is needed on the data storage system; and responsive to determining that spare capacity is needed, designating at least one of the plurality of second slices as a spare device.

15. The system according to claim 12, wherein adding the at least one of the second slices to the at least one empty erasure encoding group results in the plurality of erasure encoding groups including erasure encoding groups of different sizes.

16. The system according to claim 12, wherein the method further comprises:

determining whether at least a first threshold number of the plurality of first slices are designated as the spare slices of the data storage system, and whether a first collective storage capacity of the spare slices satisfies a first threshold amount of spare capacity; and in response to determining that at least the first threshold number of the plurality of first slices are designated as the spare slices of the data storage system and that the first collective storage capacity of the spare slices satisfies the first threshold amount of spare capacity, creating a first new erasure encoding group including at least one spare slice from the one or more first slices and a second of the plurality of second slices.

17. The system according to claim 12, wherein the plurality of first physical storage devices and the one or more second physical storage devices collectively constitute a plurality of storage devices, and wherein, for at least two of the plurality of erasure encoding groups, no two of the plurality of physical storage devices each include slices from both of the at least two erasure encoding groups.

18. The system according to claim 12, wherein the method further comprises:

determining one or more of the plurality of erasure encoding groups whose data is accessed infrequently;

designating one or more of the plurality of second slices as a member of the determined one or more erasure encoding groups in place of one or more existing slices, respectively, of the determined one or more erasure encoding groups;

moving data from the one of more existing slices being replaced to the one or more designated second slices, respectively; and re-designating the one or more existing slices as spare slices or as undesignated slices.

19. A non-transitory computer-readable medium having software stored thereon for a data storage system including a plurality of first physical storage devices and a plurality of erasure encoding groups, wherein each first physical storage device logically divided into a plurality of first slices of address spaces, one or more of the plurality of first slices is a member of one of the plurality of erasure encoding groups, each erasure encoding group includes a plurality of the first slices, and the plurality of erasure encoding groups includes at least one non-empty erasure encoding group, the software comprising:

executable code that adds one or more second physical storage devices to the data storage system;

executable code that logically divides at least one of the one or more second physical storage devices into a plurality of second slices of address spaces;

executable code that determines whether there is at least one empty erasure encoding group among the plurality of erasure encoding groups, the at least one empty erasure encoding group having no data currently stored thereon;

executable code that, responsive to determining that there is at least one empty erasure encoding group among the plurality of erasure encoding groups, performs first processing including:

selecting a first empty erasure encoding group from among the at least one empty erasure encoding group; and adding a first of the plurality of second slices to the first empty erasure encoding group;

executable code that determines that a first modification needs to be made to a first configuration of a first erasure encoding group of the one or more of the plurality of erasure encoding groups; and executable code that, responsive to determining that the first modification needs to be made to the first configuration of the first erasure encoding group, performs second that modifies the first configuration of the first erasure encoding group including:

adding at least one of the plurality of second slices to the first erasure encoding group; and performing the first modification to the first erasure encoding group, wherein the first modification includes changing a type of erasure encoding protection of the first erasure encoding group, wherein a first number of the plurality of first slices are spare slices having a collective spare storage capacity, wherein a new erasure encoding group to be created is configured from a second number of slices denoting a second storage capacity, and wherein the software further comprises:

executable code that determines whether at least a threshold number of the spare slices meeting at least a spare threshold capacity would remain if the new erasure encoding group, having a configuration with the second number of slices denoting the second storage capacity, is created from slices selected from a combination of the first number of spare slices and the plurality of second slices of the added one or more second physical storage devices; and executable code that, responsive to determining that at least the threshold number of the spare slices meeting at least the spare threshold capacity would remain if the new erasure encoding group is created, creates the new erasure encoding group with the second number of slices denoting the second storage capacity, and otherwise not creating the new erasure encoding group.

20. The non-transitory computer-readable medium according to claim 19, wherein the software further comprises:

executable code that determines whether spare capacity is needed on the data storage system; and executable code that, responsive to determining space capacity is needed, designates at least one of the plurality of second slices as a spare device.

21. The non-transitory computer-readable medium according to claim 19, wherein the software further comprises:

executable code that determines whether at least a first threshold number of the plurality of first slices are designated as the spare slices of the data storage system, and whether a first collective storage capacity of the spare slices satisfies a first threshold amount of spare capacity; and executable code that, in response to determining that at least the first threshold number of the plurality of first slices are designated as the spare slices of the data storage system and that the first collective storage capacity of the spare slices satisfies the first threshold amount of spare capacity, creates a first new erasure encoding group including at least one of the one or more first slices and a second of the plurality of second slices.

22. The non-transitory computer-readable medium according to claim 19, wherein the plurality of first physical storage devices and the one or more second physical storage devices collectively constitute a plurality of storage devices, and wherein, for at least two of the plurality of erasure encoding groups, no two of the plurality of physical storage devices each include slices from both of the at least two erasure encoding groups.

23. The non-transitory computer-readable medium according to claim 19, wherein the software further comprises:

executable code that determines one or more of the plurality of erasure encoding groups whose data is accessed infrequently;

executable code that designates one or more of the plurality of second slices as a member of the determined one or more erasure encoding groups in place of one or more existing slices, respectively, of the determined one or more erasure encoding groups;

executable code that moves data from the one of more existing slices being replaced to the one or more designated second slices, respectively; and executable code that re-designates the one or more existing slices as spare slices or as undesignated slices.

* * * * *